United States Patent
Conner et al.

(10) Patent No.: US 7,702,352 B2
(45) Date of Patent: Apr. 20, 2010

(54) NETWORK NODE POWER MANAGEMENT METHODS AND APPARATUS

(75) Inventors: W. Steven Conner, Portland, OR (US); Luiyang Lily Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1161 days.

(21) Appl. No.: 11/129,061

(22) Filed: May 13, 2005

(65) Prior Publication Data

US 2006/0258322 A1 Nov. 16, 2006

(51) Int. Cl.
*H04B 7/00* (2006.01)

(52) U.S. Cl. .................. 455/522; 455/439; 370/338

(58) Field of Classification Search ............ 455/436, 455/439, 507, 517, 522; 370/329, 331, 338
See application file for complete search history.

(56) References Cited

U.S. PATENT DOCUMENTS

| | | | |
|---|---|---|---|
| 6,697,953 | B1 | 2/2004 | Collins |
| 6,731,957 | B1 | 5/2004 | Shamoto et al. |
| 7,054,633 | B2* | 5/2006 | Seo et al. ............. 455/439 |
| 7,197,021 | B2* | 3/2007 | Seo et al. ............. 370/335 |
| 7,340,615 | B2* | 3/2008 | Krantz et al. ......... 713/300 |
| 7,394,826 | B2* | 7/2008 | Cain et al. ............ 370/469 |
| 7,418,273 | B2* | 8/2008 | Tomoe et al. ......... 455/561 |
| 7,454,215 | B2* | 11/2008 | Hamano et al. ....... 455/455 |
| 2001/0053710 | A1 | 12/2001 | Gibbons et al. |
| 2003/0158609 | A1 | 8/2003 | Chiu |
| 2004/0253996 | A1 | 12/2004 | Chen et al. |
| 2005/0136833 | A1* | 6/2005 | Emeott et al. ........ 455/11.1 |
| 2005/0138451 | A1* | 6/2005 | Simpson et al. ...... 713/320 |
| 2005/0190759 | A1* | 9/2005 | Lee et al. ............. 370/389 |
| 2005/0221825 | A1* | 10/2005 | Osugi .................. 455/436 |
| 2006/0094476 | A1* | 5/2006 | Guy ..................... 455/574 |
| 2006/0215611 | A1* | 9/2006 | Nakagawa et al. .... 370/332 |

FOREIGN PATENT DOCUMENTS

| | | |
|---|---|---|
| EP | 1473951 A2 | 11/2004 |
| WO | WO-2005009062 A1 | 1/2005 |
| WO | WO-2006/124903 A2 | 11/2006 |

OTHER PUBLICATIONS

"IEEE Std 802.11, Part 11: Wireless LAN Medium Access Control (MAC) specifications", Part 11 : Wireless LAN Medium Access Control (MAC) and Physical Layer (PHY) Specifications,(Jun. 12, 2003),1,9-19,128-137.
"German Application No. 112006001227.4, Office Action Mailed Jan. 8, 2010", 4 pgs.
"Wireless LAN Medium Access Control(MAC) and Physical Layer(PHY) Specifications", *IEEEStd802.11,Part1*, http://ieeexplore.ieee.org/ISOL/standardstoc.jsp?punumber=9543[searchedon14.12.09]., (Dec. 6, 2003), pp. 1,9-19, 128-137.
0724276.1, "United Kingdom Application Serial No. 0724276.1, Office action Mailed on Jan. 21, 2009", 20.

* cited by examiner

*Primary Examiner*—Nhan T Le
(74) *Attorney, Agent, or Firm*—Schwegman, Lundberg & Woessner, P.A.

(57) ABSTRACT

Network node power management methods and apparatus are generally described herein. Other embodiments may be described and claimed.

6 Claims, 7 Drawing Sheets

NETWORK NODE POWER MANAGEMENT METHODS AND APPARATUS

TECHNICAL FIELD

Various embodiments described herein relate generally to power management for electronic devices, and more particularly to apparatus, systems, and methods for managing power consumption within a wireless network.

BACKGROUND

Many electronic communication devices are subjected to power constraints. For example, cellular telephones, radios, and pagers may use rechargeable batteries to provide device power when the device is not attached to a continuous power source. The amount of time that a device is operational between battery charges depends on the rate of power consumption of the device. Developers continue to derive new ways of extending the operational time of power-constrained communications devices.

DETAILED DESCRIPTION

Various embodiments of the inventive subject matter, described below, include apparatus and methods for network nodes to manage their power consumption. Embodiments may be implemented in any of a number of different types of communications systems and devices. For example, but not by way of limitation, embodiments may be implemented in systems that include a wireless "mesh" network, which also may be referred to as an "ad-hoc" network, because the network may be created and disbanded as mesh-enabled devices join and leave the network. A mesh network may be a wired network, a wireless network, or a combination thereof.

An example wireless mesh network configuration is described below in order to illustrate various embodiments. The below example is not meant to limit the scope of the inventive subject matter only to embodiments implemented within a wireless mesh network. Instead, as would be apparent to one of skill in the art, based on the description herein, embodiments could be implemented in a number of alternative types of networks.

Figure 1:
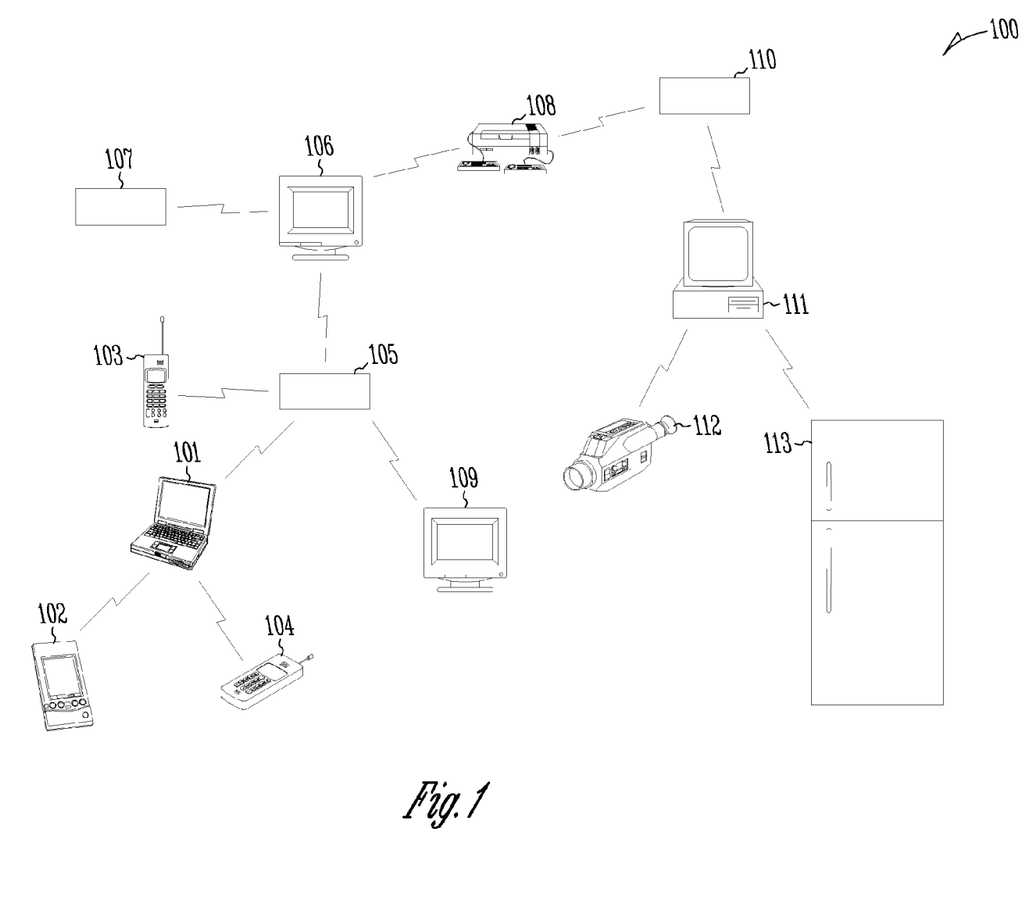
FIG. 1 is a schematic diagram representation of a wireless mesh network, in accordance with an example embodiment.

FIG. 1 is a schematic diagram representation of a wireless mesh network 100, in accordance with an example embodiment. Wireless mesh network 100 may be implemented, for example, as a wireless local area network (WLAN), a wireless wide area network (WWAN), a wireless local loop (WLL), a radio area network (RAN), a personal area network (PAN), or any combination thereof.

Network 100 may include from two to numerous "mesh-enabled" nodes, such as nodes 101, 102, 103, 104, 105, 106, 107, 108, 109, 110, 111, 112, 113. In a particular embodiment, some or all of the mesh-enabled nodes 101-113 include wireless communications capabilities (e.g., radios, infrared devices, or other), which enable the mesh-enabled nodes 101-113 to communicate over the medium of free space. Some or all of the mesh-enabled nodes 101-113 also may include hardwired interconnections, in other embodiments.

A mesh-enabled node includes an electronic device, which includes one or more apparatus capable of establishing a connection with one or more other nodes within a mesh network. A mesh-enabled node may be stationary, mobile or portable. Further, a mesh-enabled mode may be capable of operating using a limited power source (e.g., battery power), a continuous power source, or both. For example, but not by way of limitation, a mesh-enabled node may be a handheld or notebook computer 101, a personal data assistant (PDA) 102, a cellular telephone 103, a portable telephone 104, a digital video disk (DVD) player 105, a television 106 (e.g., a high-definition television (HDTV)), a set-top box 107, a game console 108, a monitor 109, a wireless router 110, a desktop computer 111, a camcorder 112, or a refrigerator 113, to name a few. Numerous other types of consumer electronic devices, network adaptors, and/or other electronic devices may be mesh-enabled nodes.

In some implementations, the nodes (e.g., nodes 101-113) within a mesh network may be located in relatively close proximity to each other. For example, but not by way of limitation, a mesh network may be implemented within a home, an office building, an enterprise or public space (e.g., an airport or shopping mall), a conference hall, an industrial setting, or another relatively small geographical area. One or more nodes within a mesh network may be able to communicate with one or more "mesh portals" (not illustrated), which may provide communication bridges to other networks (e.g., other mesh networks).

Mesh network 100 may be considered a "self-configuring" system, meaning that a mesh-enabled node (e.g., some or all of nodes 101-113) may have the ability to discover other "neighboring" mesh-enabled nodes within range, authenticate and establish peer-to-peer connections with one or more of those neighboring nodes, and work out efficient communication routes for a particular task. Nodes 101-113 may readily join or leave the network 100. As they do, communication paths may dynamically change through the network 100.

Each node 101-113 within mesh network 100 may receive messages destined for the node and may transmit messages originating from the node. In a "single-hop" mesh network, a node may transmit messages with enough power to be received by all other nodes within the mesh network. Embodiments of the inventive subject matter may be implemented in single-hop mesh networks.

Embodiments may also be implemented in "multi-hop" mesh networks. In a multi-hop mesh network, such as network 100, some or all nodes 101-113 may act as routers to receive and forward messages destined for other nodes. Accordingly, a message from a source node to a destination node may be sent through multiple hops. For example, a person may insert a DVD into a mesh-enabled DVD player 105, and the audio-video information may be sent via a mesh-enabled television 106, a mesh-enabled game console 108, and a mesh-enabled wireless router 110 to be played on a mesh-enabled desktop computer 111.

In a multi-hop network 100, a node 101-113 may use a relatively low transmit power. The transmit power may be sufficient to reach nearby neighboring nodes, but may not be sufficient to reach all nodes within the network. Accordingly, multi-hop networking may allow channel re-use, thereby improving spatial capacity. By using relatively lower transmit power, nodes in different areas within the mesh network may transmit simultaneously without interference.

In various embodiments, a mesh-enabled node (e.g., some or all of nodes 101-113) may be capable of dynamically changing between different operational modes, each of which may have different power consumption and/or performance characteristics. This capability may be referred to herein as "dynamic mode adaptation." Embodiments of dynamic mode adaptation will be described in detail in conjunction with FIGS. 2-7.

Figure 2:
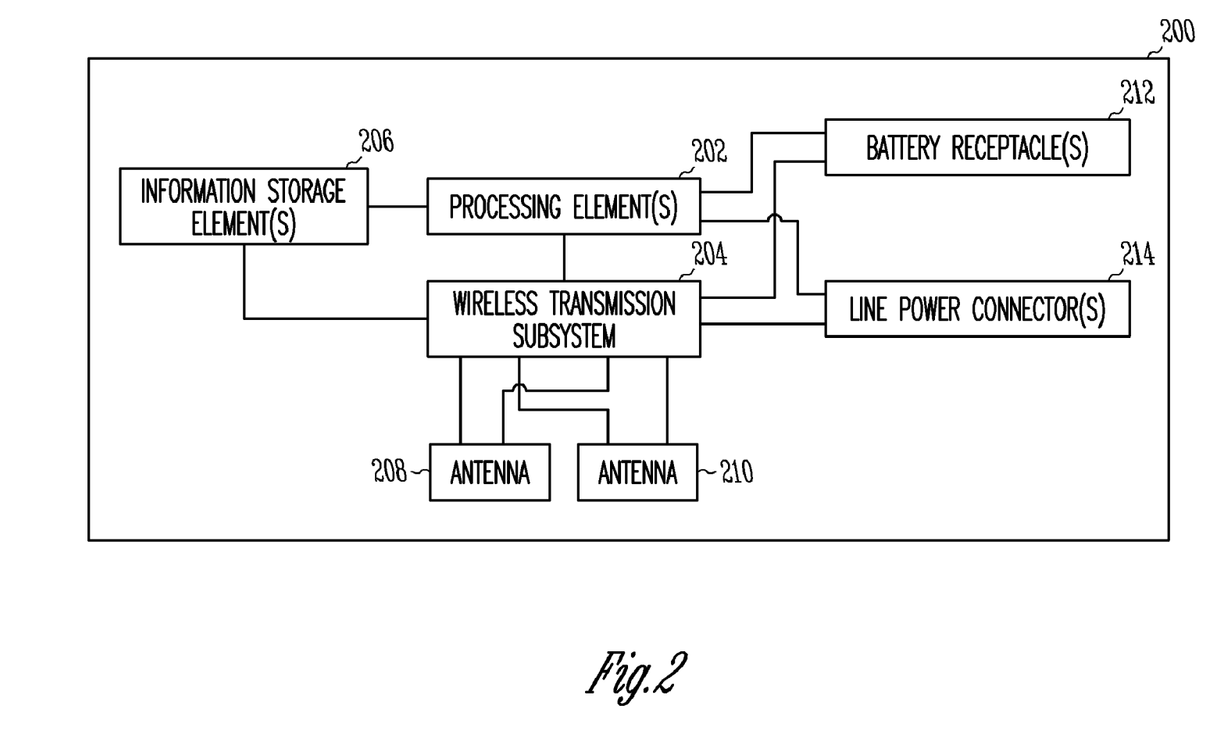
FIG. 2 is a simplified block diagram of a wireless, mesh-enabled node, in accordance with an example embodiment.

FIG. 2 is a simplified block diagram of a wireless mesh-enabled node 200, in accordance with an example embodiment. In an embodiment, mesh-enabled mode 200 includes one or more processing elements 202, one or more wireless transmission subsystems 204, and one or more information storage elements 206. Nodes that communicate via radio signals over an air interface may also include one or more antennas 208, 210 (e.g., monopole, omnidirectional, and/or dipole antennas) for sending information-carrying signals over and receiving information-carrying signals from the air interface. In alternate embodiments, node 200 may include one or more infrared (IR) communication mechanisms.

In an embodiment, node 200 also includes one or more battery receptacles 212 for receiving single charge or rechargeable batteries. Node 200 may also includes one or more line power connectors 214 for connecting to a continuous source of power, in an embodiment. Power from batteries installed in battery receptacles 212 and/or power received through line power connectors 214 may be used by processing elements 202 and/or wireless transmission subsystem 204 to operate.

The one or more processing elements 202 may include one or more microprocessors, application-specific integrated circuits (ASICs), special-purpose processors, and/or other processing-related components. Processing elements 202 may process information, and produce data, consume data, and/or produce control information. In an embodiment, processing elements 202 send information to and/or receive information from wireless transmission subsystem 204.

Wireless transmission subsystem 204 may prepare and send information from processing elements 202 over the air interface, via one or more antennas 208, 210 or other wireless physical medium interfaces. Wireless transmission subsystem 204 also or alternatively may receive information over the air interface, and prepare and send the information to processing elements 202. Wireless transmission subsystem 204 may include hardware and software for implementing one or more communications protocols. For example, but not by way of limitation. Wireless transmission subsystem 204 may implement one or more communications protocols such as one or more IEEE 802.11 standards (e.g., ANSI/IEEE Std 802.11, 1999 Edition, draft ANSI/IEEE Std 802.11e/D12.0 published November 2004, ANSI/IEEE Std 802.11s (proposed), or other IEEE 802.11 standards). Wireless transmission subsystem 204 may implement one or more other communications protocols, as well.

Information storage elements 206 may store data used by processing elements 202 and/or wireless transmission subsystem 204. Information storage elements 206 also may store one or more machine-executable instructions, in the form of lines of code, for execution by processing elements 202 and/or wireless transmission subsystem 204. Information storage elements 206 may include one or more volatile or non-volatile computer-readable media. These computer-readable media may include hard disks, removable magnetic disks, removable optical disks, magnetic cassettes, memory cards or sticks, digital video disks, random access memories (RAMs), read only memories (ROMs), and the like.

In an embodiment, node 200 may be capable of performing dynamic mode adaptation, as described above, which includes switching between two or more operational modes based on one or more decision-making criteria. For example, but not by way of limitation, some decision-making criteria may include: 1) whether node 200 is operating on battery power or is connected to a continuous power source; 2) the current or projected power available to node 200; 3) control inputs received over the network or from an operator of node 200; 4) an upcoming event, which may change the node's functionality (e.g., an imminent power down, out-of-range condition, operating system crash, etc.).

An "operational mode" is a node state, within which the node implements a set of communication procedures for sending messages to and receiving messages from other nodes in the network (e.g., Mesh Points, Power-Saving Mesh Points, Stations, etc.). In an embodiment, power management techniques are implemented in some operational modes, which are likely to empower the node to efficiently use its available power. In an embodiment, node 200 may perform dynamic mode adaptation by selectively switching between operating in one of three or more operational modes, which include Mesh Point mode, Power-Saving Mesh Point mode, and Station mode. In alternate embodiments, a node may switch between operating in more or fewer than three operational modes. Each of these modes is described in more detail in the following paragraphs.

Mesh Point (MP) mode: When a node is operating in MP mode, the node may be referred to as a Mesh Point (MP). In MP mode, a node may support mesh networking services, including but not limited to, discovery of neighbors, path selection, and multi-hop forwarding in the mesh network. Unless otherwise specified, a node operating in MP mode may be assumed to be a full participant in the operation of the mesh network, and is always awake to communicate with its neighbors. An MP that also provides access point services may be referred to as a Mesh Access Point (MAP).

Power-Saving Mesh Point (PSMP) mode: A node operating in PSMP mode may be referred to as a PSMP, in an embodiment. A PSMP is an MP that performs power management, and accordingly may alternate between a "PSMP active mode" and a "PSMP power-save mode." During the PSMP active mode, a PSMP may function substantially as an MP, and accordingly may maintain communications with one or more neighbors and may readily exchange messages with the neighbors. To enter the PSMP power-save mode, a PSMP may temporarily suspend communications with neighbors, and various PSMP components or subsystems (e.g., processors, radios, etc.) may enter low-power operations or be turned off altogether, in an effort to reduce the node's power consumption. The PSMP may transition from the PSMP power-save mode to the PSMP active mode to exchange messages with neighbors. In an embodiment, when a node is operating in PSMP mode, the node does not operate as an access point (e.g., a MAP).

Station mode: When a node is operating in Station ("STA") mode, the node may be referred to as a station (STA). In an embodiment, a STA connects to a MAP to gain access to the mesh network, but the STA does not participate directly in the operation or communication of the mesh network. A STA may perform power management, and accordingly may alternate between a "STA active mode" and a "STA power-save mode." While in the STA active mode, a STA may maintain communications with a MAP, and accordingly may readily exchange messages with the MAP. To enter the STA power-save mode, a STA may temporarily suspend communications with the MAP, and various STA components (e.g., processors, radios, etc.) may enter low-power operations or be turned off altogether, in an effort to reduce the node's power consumption. A STA may spend a significant amount of time in a STA power-save mode, and may transition from the STA power-save mode to the STA active mode only from time-to-time to communicate with the MAP.

At least three differences may exist between STA mode and PSMP mode:

1) A node may switch to STA mode when at least one of its neighboring MPs also is an access point (e.g., a MAP). In contrast, a node may switch to PSMP mode regardless of whether or not at least one of its neighboring MPs is also an access point.
2) A node that switches to STA mode associates itself with one neighboring MAP, and all of the node's traffic is forwarded via this MAP. In contrast, a node operating in PSMP mode may maintain multiple connections with the rest of the network via multiple neighbors. As a result, a node operating in PSMP mode is likely to obtain higher quality links with better reliability and redundancy than a node operating in STA mode.
3) When the distance between a STA and its current MAP increases, or as the quality of the link between them degrades, the STA may have to dissociate with its current MAP and associate with another MAP to maintain connectivity to the mesh network. In contrast, a node operating in PSMP mode may take advantage of built-in mobility support by dynamically choosing high-quality routes to the rest of the mesh network, via multiple neighbor node connections.

In an embodiment, any type of node (e.g., types such as nodes 101-113, FIG. 1, or others) may be able to perform dynamic mode adaptation, and thus alternate between operating in MP mode, PSMP mode, or STA mode. In another embodiment, some nodes within the mesh network may only alternate between a subset of the modes. For example, a particular node may only alternate between MP mode and PSMP mode, but not STA mode. Alternatively, a particular node may only alternate between PSMP mode and STA mode, but not MP mode. Finally, a particular node may only alternate between MP mode and STA mode, but not PSMP mode.

In an embodiment, dynamic mode adaptation is provided in nodes that may operate using a limited source of power (e.g., battery power). Such nodes may also have the ability to be connected to a continuous source of power. Dynamic mode adaptation may also be provided in nodes that may only operate using a continuous source of power (e.g., line power). Further, dynamic mode adaptation may be enabled or disabled on a particular node, in an embodiment.

Figure 3:
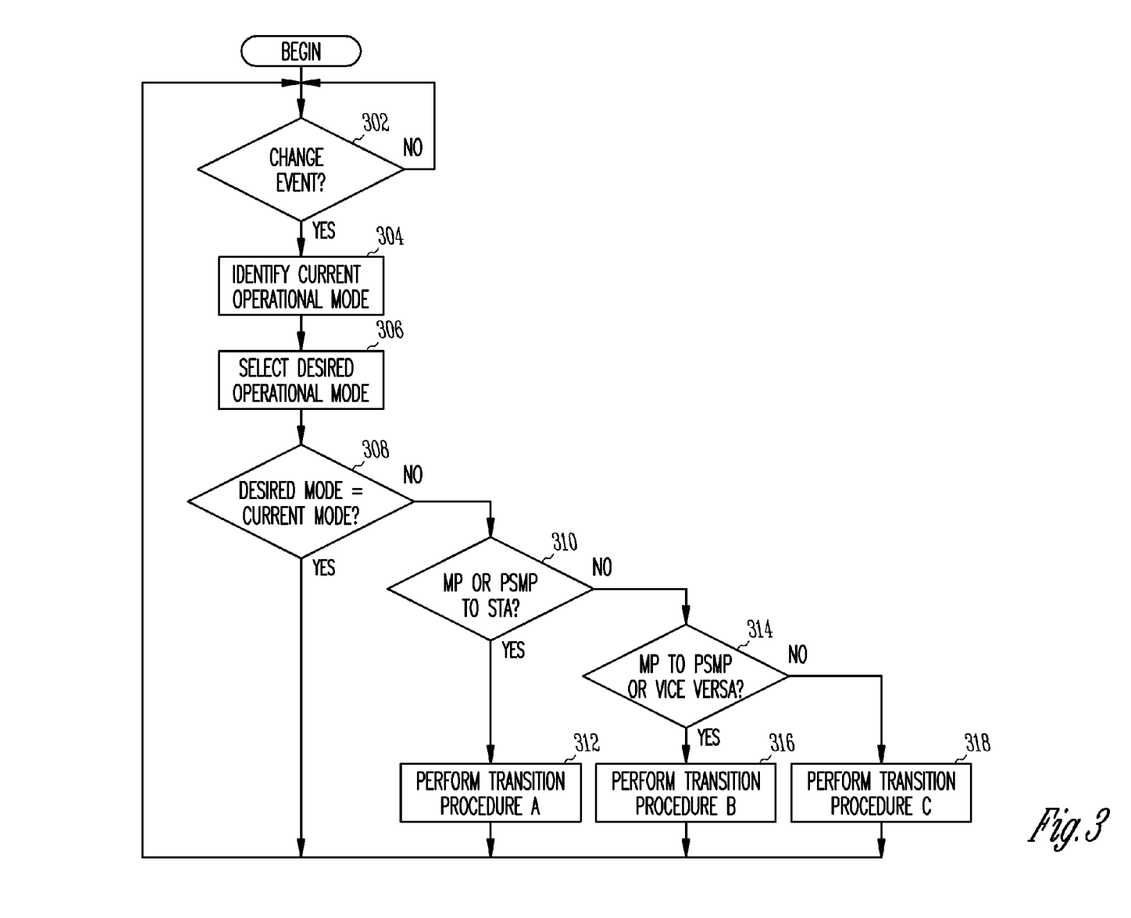
FIG. 3 is a flowchart of a method for conserving power in a wireless, mesh-enabled node, in accordance with an example embodiment.

FIG. 3 is a flowchart of a method for conserving power in a wireless mesh-enabled node, in accordance with an example embodiment. Embodiments of the method may be useful in power-constrained nodes (e.g., battery-powered devices) to conserve and efficiently utilize limited battery power. Embodiments of the method also may be useful in nodes that are not power-constrained (e.g., line powered devices), as well.

The method begins, in block 302, by determining whether an operational mode "change event" has been detected. A change event may be any event that precipitates an operational mode change. In various embodiments, operational mode change events include, but are not limited to: 1) the node switching from battery power to line power; 2) the node switching from line power to battery power; 3) the node's available battery power falling to or below a battery charge threshold; 4) the node's available battery power rising to or above a battery charge threshold; 5) the value of a projection of future available power approaching or reaching a threshold; 6) a control input received over the network or from an operator of the node; 7) an imminent power down of the node; 8) an imminent out-of-range condition of the node; 9) an imminent operating system crash; and/or 10) another event, which may change the node's functionality. For simplicity of description, the description herein focuses on operational mode change events relating to the node's currently available power, or events listed as 1-4, above. It is to be understood that the scope of the inventive subject matter encompasses other operational mode change events, as well, and so the examples given herein are not meant to limit the scope of the inventive subject matter only to those examples.

As implied above, in an embodiment, one or more battery charge thresholds may be specified, and an operational mode change event may occur whenever one of the battery charge thresholds is reached or transitioned through. In some embodiments, battery charge thresholds may be set to values that do not depend on whether a positive power change or a negative power change precipitated the operational mode transition. In other embodiments, hysteresis may be built into the battery charge threshold settings to avoid mode transition jitter that may occur when a node's power is proximate to battery charge threshold. For example, one or more first thresholds (e.g., "negative-going power thresholds") may apply when the battery charge is depleting (e.g., a threshold is crossed from above), and one or more second, different thresholds (e.g., "positive-going power thresholds") may apply when the battery charge is increasing.

Referring again to block 302, when an operational mode change event has not occurred, then the process iterates as shown. When an operational mode change event has occurred, then the node begins a process of performing a transition from the current operational mode to a desired operational mode in response to the change event. In an embodiment, a rate of power consumption of the node is likely to be altered by the transition. In an embodiment, the transition may begin, in block 304, by identifying the node's current operational mode. For example, the node's current operational mode may be either MP mode, PSMP mode, or STA mode.

In block 306, a desired mode may be selected based on the node's current operational mode and the condition or status of the node (e.g., whether line or battery powered, and the battery charge level), after experiencing the operational mode change event. In an embodiment, an operational mode change event may place the node in a condition that is identified to correspond to a particular desired operational mode. Several examples follow of correlations between node condition and desired operational mode. These examples are meant for the purposes of explanation and not of limitation.

EXAMPLE 1

For example, but not by way of limitation, when a node is line powered, a desired operational mode may be specified as MP mode. When the node is battery powered, and the power is above a specified charge threshold, the desired operational mode may be specified as PSMP mode. When the node is battery powered, and the power is below the specified charge threshold, the desired operational mode may be specified as STA mode.

EXAMPLE 2

For example, but not by way of limitation, when a node is line powered, a desired operational mode may be specified as MP mode. When the node is battery powered, and the power is above a relatively high charge threshold, the desired operational mode may also be specified as MP mode. When the node is battery powered, and the power is between the relatively high charge threshold and a relatively low charge threshold, the desired operational mode may be specified as PSMP mode. When the node is battery powered, and the power is below the relatively low charge threshold, the desired operational mode may be specified as STA mode.

EXAMPLE 3

For example, but not by way of limitation, when a node is line powered, a desired operational mode may be specified as MP mode. When the node is battery powered, the desired operational mode may be specified as PSMP mode. In an embodiment, the node may toggle between MP mode and PSMP mode, and STA mode may not be available at all.

EXAMPLE 4

For example, but not by way of limitation, when a node is battery powered, and the power is above a specified charge threshold, the desired operational mode may be specified as PSMP mode. When the node is battery powered, and the power is below the specified charge threshold, the desired operational mode may be specified as STA mode. In an embodiment, the node may toggle between PSMP mode and STA mode, and MP mode may not be available at all.

In another embodiment, selection of a desired operational mode may be dependent on the character of the operational mode change event, rather than the node's status or condition. For example, but not by way of limitation, the character of the operational mode change event may indicate whether it is desirable for the node to switch to a more efficient mode or to a less efficient mode, with respect to power usage. In an embodiment, the character of the operational mode change event may be classified as a "positive change" or a "negative change." In particular, when the operational mode change event is an event pertaining to the power currently available to the node, the character of the operational mode change event may be classified as a "positive power change" or a "negative power change."

A "positive power change," as used herein, is a change in the node's available power toward higher power availability. For example, but not by way of limitation, positive power changes may include events such as the node being plugged into a continuous power source (e.g., line power) or the node's battery charge rising to or above one or more positive-going power thresholds. When a positive power change occurs, a desired mode may be selected that has increased node performance. For example, if a node is in STA mode and a positive power change occurs, a desired mode may be selected as a PSMP mode or an MP mode.

A "negative power change," as used herein, is a change in the node's available power toward lower power availability. For example, but not by way of limitation, negative power changes may include events such as the node being unplugged from a continuous power source or the node's battery charge falling to or below one or more negative-going power thresholds. When a negative power change occurs, a desired mode may be selected that has decreased node performance. For example, if a node is in MP mode and a negative power change occurs, a desired mode may be selected as a PSMP mode or STA mode.

Once a desired operational mode is selected, in block 306, a determination may be made, in block 308, whether the desired operational mode is the same as the current operational mode. When the desired operational mode is the same as the current operational mode, then an operational mode change may not be relevant, and the method may iterate as shown. When the desired operational mode is not the same as the current operational mode, then the node may perform an operational mode change using a procedure that may depend on the current operational mode and the desired operational mode.

In an embodiment, in block 310, a determination may be made whether a transition is to be performed from a current MP mode or a current PSMP mode to a desired STA mode. If so, then a first operational mode transition procedure may be performed, in block 312, which is referred to herein for convenience as "Procedure A." Procedure A will be described in more detail in conjunction with FIG. 5.

When the transition to be performed is not a transition from a current MP mode or a current PSMP mode to a desired STA mode, then in block 314, a determination may be made whether a transition is to be performed from a current MP mode to a desired PSMP mode, or vice versa (i.e., from a current PSMP mode to a desired MP mode). If so, then a second operational mode transition procedure may be performed, in block 316, which is referred to herein for convenience as "Procedure B." Procedure B will be described in more detail in conjunction with FIG. 6.

When the transition to be performed are neither of the transitions described in conjunction with blocks 310 or 314, then it may be deduced that the transition to be performed is a transition from a current STA mode to a desired MP mode or PSMP mode. If so, then a third operational mode transition procedure may be performed, in block 318, which is referred to herein for convenience as "Procedure C." Procedure C will be described in more detail in conjunction with FIG. 7.

After performing the identified transition procedure (e.g., one of blocks 312, 316, 318), the method may iterate as shown. The various blocks described in conjunction with FIG. 3 may be differently arranged in different embodiments. In addition, some of the procedures may be performed in parallel, and/or broken out and performed in different procedural blocks, and/or grouped together into different arrangements. For example, but not by way of limitation, the decision blocks (e.g., blocks 308, 310) for determining which operational mode transition procedure to use may be differently arranged or may have different logic to arrive at the same transition procedures.

Figure 4:
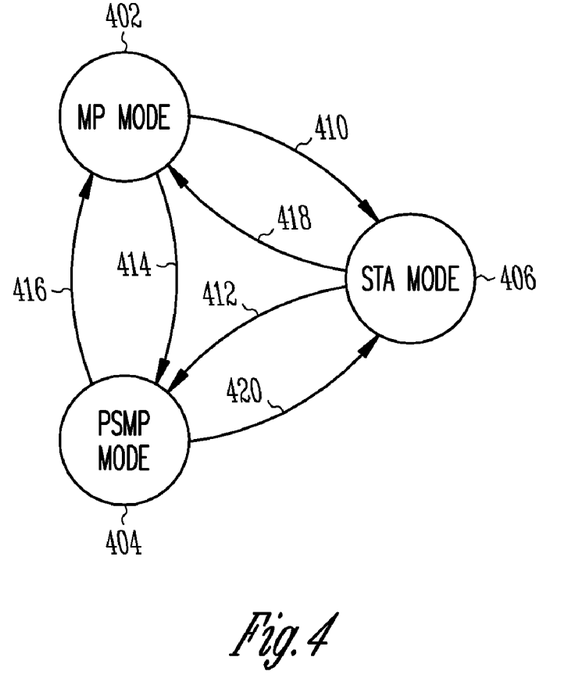
FIG. 4 is a diagram indicating various operational modes and mode transitions, in accordance with an example embodiment.

FIG. 4 is a diagram indicating various operational modes and mode transitions, in accordance with an example embodiment. As described previously, some or all nodes within a mesh network may alternate between operating in any of three operational modes, in an embodiment, which include MP mode 402, PSMP mode 404, and STA mode 406.

A node in MP mode 402 or PSMP mode 404 may transition into Simple STA mode 406, as indicated by arrows 410 and 420, respectively. In an alternate embodiment, a node in MP mode 402 may not transition directly into Simple STA mode 406, but instead may transfer first into PSMP mode 404. Mode transitions depicted by arrows 410 and 420 may be characterized as "increased power conservation" mode transitions, because they transition the node into a desired mode that may have less power consumption than when the node is in the current mode, although that may not necessarily be the case during actual implementation. Mode transitions depicted by arrows 410 and 420 may be implemented using a first operational mode transition procedure (e.g., Procedure A, block 312, FIG. 3), which will be described in more detail in conjunction with FIG. 5.

A node in MP mode 402 may transition into PSMP mode 404, and a node in PSMP mode 404 may transition into MP mode 402, as indicated by arrows 414 and 416, respectively. The mode transition depicted by arrow 414 may be characterized as an increased power conservation mode transition, as described above, although it may not necessarily be during actual implementation. The mode transition depicted by arrow 416 may be characterized as a "decreased power conservation" mode transition, because it transitions the node into a desired mode that may have greater power consumption than when the node is in the current mode, although that may not necessarily be the case during actual implementation. Mode transitions depicted by arrows 414 and 416 may be implemented using a second operational mode transition procedure (e.g., Procedure B, block 316, FIG. 3), which will be described in more detail in conjunction with FIG. 6.

A node in STA mode 406 may transition into MP mode 402 or PSMP mode 404, as indicated by arrows 418 and 412, respectively. In an alternate embodiment, a node in STA mode 406 may not transition directly into MP mode 402, but instead may transfer first into PSMP mode 404. The mode transitions depicted by arrows 418 and 412 may be characterized as decreased power conservation mode transitions, as described above, although they may not necessarily be during actual implementation. Mode transitions depicted by arrows 418 and 412 may be implemented using a third operational mode transition procedure (e.g., Procedure C, block 318, FIG. 3), which will be described in more detail in conjunction with FIG. 7.

Figure 5:
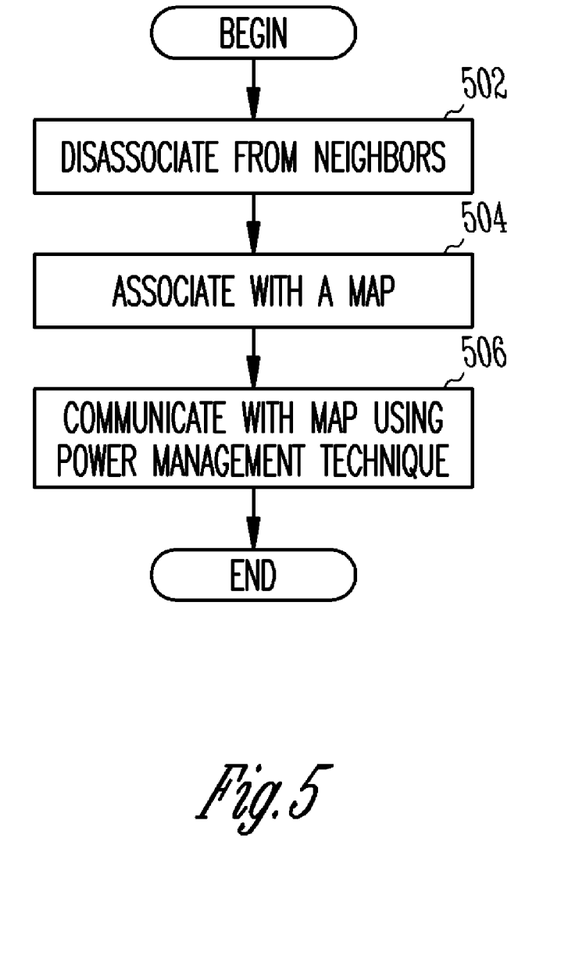
FIG. 5 is a flowchart of a method for a node to change operations from a mesh point mode or power-saving mesh point mode to a station mode, in accordance with an example embodiment.

FIG. 5 is a flowchart of a method for a node to change operations from MP mode or PSMP mode to STA mode, in accordance with an example embodiment. The method begins, in block 502 by the node disassociating from all neighbors with whom the node currently is associated. Disassociation may involve notifying the neighbors that they should no longer send messages to the node. Once the node has disassociated from its neighbors, it has effectively stopped participating as an MP or PSMP in the mesh network.

In block 504, the node may associate with a MAP within the mesh network. Associating with a MAP may involve sending the MAP information regarding the node's address and capabilities, among other things. In alternative embodiments, block 504 may occur before block 502, or the blocks may be performed in parallel.

In block 506, the node may begin communicating with the MAP. In addition, in an embodiment, the node may also implement a power management technique, which may include periodically or occasionally transitioning from a STA active mode to a STA power-save mode, and vice versa. During the STA active modes, the node may receive messages from the MAP. The node may also send messages to the MAP, which are destined for the MAP or for some other node in the mesh network. During the STA power-save modes, the MAP may queue messages destined for the node for later delivery after the node again transitions to a STA active mode. In various embodiments, the power management technique implemented by the node may be consistent with a standard. For example, but not by way of limitation, the node may implement Power-Save Mode (PSM), as that power management technique is specified in an Institute of Electrical and Electronics Engineers (IEEE) 802.11 standard (e.g., ANSI/IEEE Std 802.11, 1999 Edition). Alternatively, the node may implement Automatic Power-Save Delivery (APSD), as that power management technique is specified in an IEEE 802.11e standard (e.g., draft ANSI/IEEE Std 802.11e/D12.0 published November 2004). Other power management techniques may be implemented in other embodiments. Once the node has transitioned into the STA mode, the method ends.

Figure 6:
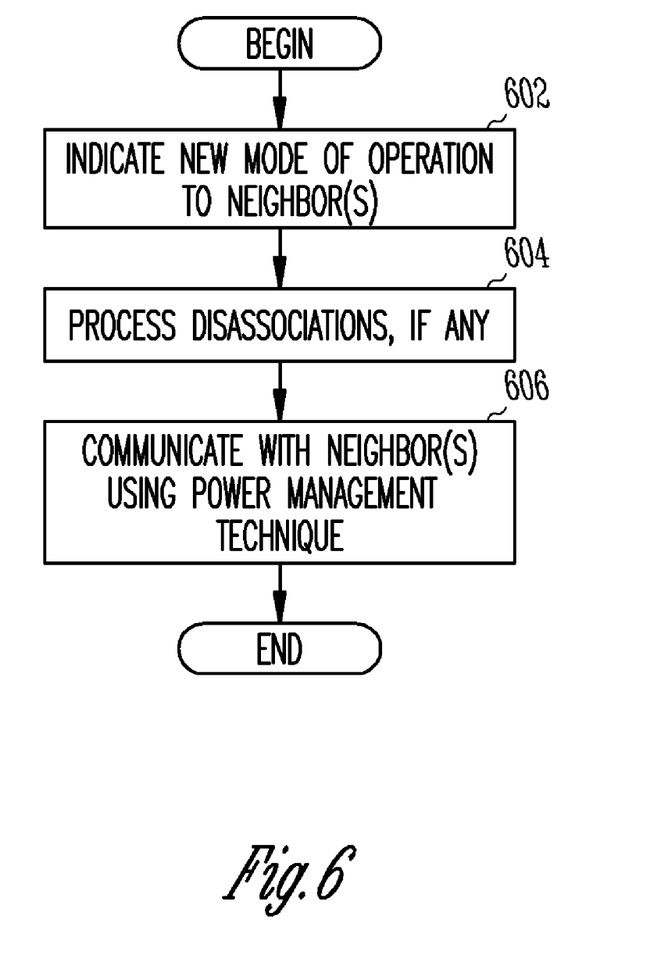
FIG. 6 is a flowchart of a method for a node to change operations between a mesh point mode and a power-saving mesh point mode, in accordance with an example embodiment.

FIG. 6 is a flowchart of a method for a node to change operations between MP mode and PSMP mode, in accordance with an example embodiment. The method begins, in block 602 by the node indicating its new operational mode to the neighbors with whom it is associated. In an embodiment, this may include the node sending an information element to each neighbor that is an MP or a PSMP. If the new mode is PSMP mode, then the neighbors know to hold messages destined for the node or to be passed through the node until the node is in a PSMP active mode. If the new mode is MP mode, then the neighbors need not hold messages for the node.

In an embodiment, some neighboring MPs and/or PSMPs may opt to disassociate with the node, if those neighbors do not support direct communication with a node in the new mode transitioned to. For example, some neighboring MPs and/or PSMPs may not support direct communication with a node in PSMP mode. Accordingly, those neighbors may opt to disassociate. In block 604, the node processes disassociations with neighboring nodes, if any occur.

In block 606, the node may begin communicating with its neighbors. If the node has transitioned into a PSMP mode, then the node may also implement a power management technique, in an embodiment, which may include periodically or occasionally transitioning from a PSMP active mode to a PSMP power-save mode, and vice versa. During the PSMP active modes, the node may send messages to and receive messages from neighbors, and participate as a member of the mesh network. During the PSMP power-save modes, the neighbors may queue messages destined for the node or to be passed through the node for later delivery after the node again transitions to a PSMP active mode. In various embodiments, the power management technique implemented by the node may be consistent with a standard. For example, but not by way of limitation, the node may implement PSM or APSD, as described previously. Other power management techniques may be implemented in other embodiments. Once the node has transitioned into the MP mode or PSMP mode, whichever is the desired mode, the method ends.

Figure 7:
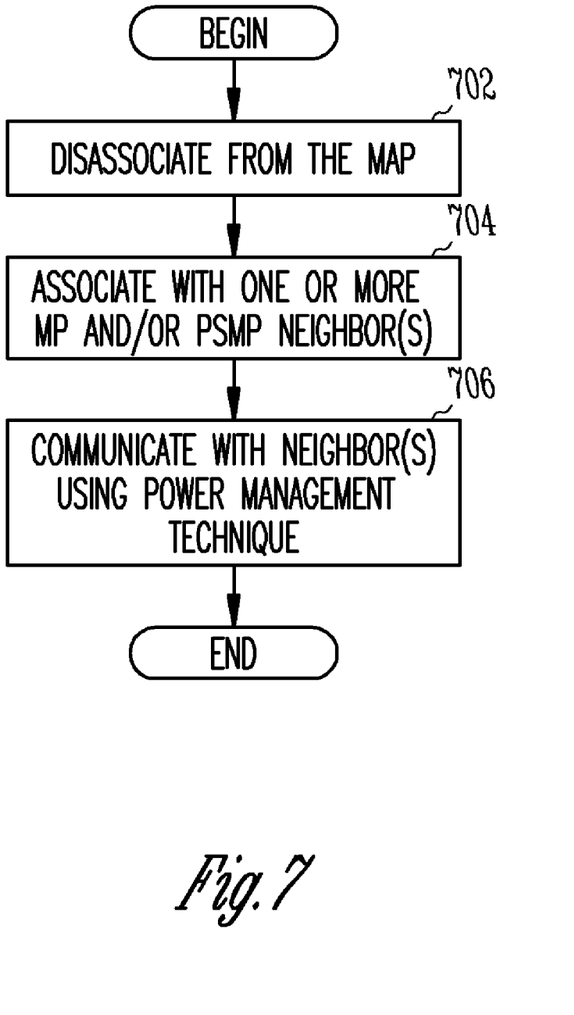
FIG. 7 is a flowchart of a method for a node to change operations from a station mode to a mesh point mode or power-saving mesh point mode, in accordance with an example embodiment.

FIG. 7 is a flowchart of a method for a node to change operations from STA mode to MP mode or PSMP mode, in accordance with an example embodiment. The method begins, in block 702 by the node disassociating from the MAP with whom the node currently is associated. Disassociation may involve notifying the MAP that it should no longer send messages to the node.

In block 704, the node may associate with one or more MP and/or PSMP neighbors within the mesh network. Associating with an MP and/or PSMP may involve sending the MP and/or PSMP information regarding the node's address and capabilities, among other things. In alternative embodiments, block 704 may occur before block 702, or the blocks may be performed in parallel.

In block 706, the node may begin communicating with the neighboring MPs and/or PSMPs. If the node has transitioned into a PSMP mode, then the node may also implement a power management technique, in an embodiment, which may include periodically or occasionally transitioning from a PSMP active mode to a PSMP power-save mode, and vice versa. In various embodiments, the power management technique implemented by the node may be consistent with a standard. For example, but not by way of limitation, the node may implement PSM or APSD, as described previously. Other power management techniques may be implemented in other embodiments. Once the node has transitioned into the MP mode or PSMP mode, whichever is the desired mode, the method ends.

In various embodiments, transitions between operational modes may be selected to strike a balance between efficient power consumption and node performance, as it relates to network communications. Theoretically, node performance is likely to be highest when a node is in MP mode, less when a node is in PSMP mode, and the least when a node is in STA mode, although this performance hierarchy may not necessarily hold true in an actual implementation. Also theoretically, power conservation is likely to be at its most efficient when a node is in STA mode, less efficient when a node is in PSMP mode, and the least efficient when a node is in MP mode, although this power conservation hierarchy may not necessarily hold true in an actual implementation.

Node performance, with respect to network communications, is likely to be at its highest, in an embodiment, when the node is in MP mode, because the node is a participant in the mesh network, and the components responsible for communicating over the network are continuously powered up and available to exchange messages with other nodes. Node performance is likely to be lower when the node is in PSMP mode, because although the node may still participate as a member of the mesh network, the node components responsible for communicating over the network are powered up and available to exchange messages with other nodes only during PSMP active modes. Accordingly, delays in message receipt, transmission, and processing may occur. Node performance is likely to be at its lowest when the node is in the STA mode. In the STA mode, the node does not fully participate as a member of the mesh network, but instead communicates with a single access point (e.g., a MAP). Further, the node may communicate messages with the access point only during STA active modes.

Although node performance is likely to be at its lowest during the STA mode, power consumption is likely to be at its most efficient. Because a node in STA mode communicates with only one other node (e.g., a MAP) during STA active modes, and because the STA may spend a significant amount of time in STA power-save modes, the STA is likely to consume significantly less power in STA mode than in PSMP mode or MP mode. In an embodiment, a node in PSMP mode is likely to consume less power than the same node in MP mode, because the node in PSMP mode may spend significant amounts of time in PSMP power-save modes. In MP mode, the node components responsible for communicating over the network may be continuously powered up and available to exchange messages with other nodes. Accordingly, a node is likely to consume significantly more power when it is in MP mode, than when it is in PSMP mode or STA mode.

Thus, various embodiments of methods, apparatus, and systems have been described for network node power management. The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

The various procedures described herein can be implemented in hardware, firmware or software. A software implementation can use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, memory cards or sticks, digital video disks, RAMs, ROMs, and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Embodiments of the inventive subject matter may be referred to, individually and/or collectively, herein by the term "invention" merely for convenience and without intending to voluntarily limit the scope of this application to any single invention or inventive concept if more than one is, in fact, disclosed. It will be recognized that the methods of various embodiments can be combined in practice, either concurrently or in succession. Various permutations and combinations may be readily apparent to those skilled in the art.

What is claimed is:

1. A method comprsing:
detecting, by a node operating in an ad hoc mesh network in which the node can establish peer-to-peer connections with one or more neighboring nodes, a change event associated with power available to the node, wherein detecting the change event comprises determining that available battery power has fallen to or below a battery charge threshold; and
performing a transition, by the node, from a current operational mode to a desired operational mode in response to the change event, wherein performing the transition includes performing a transition from a mesh point mode to a power saving mesh point mode, wherein within the mesh point mode the node is always awake to communicate with neighbor nodes, and wherein within the power saving mesh point mode the node performs power management and alternates between an active mode and a power-save mode.

2. The method of claim 1, wherein a rate of power consumption of the node can be altered by the transition.

3. The method of claim 1, wherein the desired operational mode can have less power consumption than the current operational mode.

4. A computer-readable medium having program instructions stored thereon to perform a method, which when executed within an electronic device, result in:

detecting, by a node operating in an ad hoc mesh network in which the node can establish peer-to-peer connections with one or more neighboring nodes, a change event associated with power available to the node, wherein detecting the change event comprises determining that available battery power has risen to or above a battery charge threshold; and performing a transition by the node, from a current operational mode to a desired operational mode in response to the change event, wherein performing the transition includes performing a transition from a power saving mesh point mode to a mesh point mode, wherein within the mesh point mode the node is always awake to communicate with neighbor nodes, and alternates between an active mode and a power-save mode.

5. The computer-readable medium of claim 4, wherein a rate power consumption of the node can be altered by the transition.

6. The computer-readable medium of claim 4, wherein the desired operational mode can have greater power consumption than the current operational mode.

* * * * *

UNITED STATES PATENT AND TRADEMARK OFFICE
CERTIFICATE OF CORRECTION

PATENT NO. : 7,702,352 B2  Page 1 of 1
APPLICATION NO. : 11/129061
DATED : April 20, 2010
INVENTOR(S) : W. S. Conner et al.

It is certified that error appears in the above-identified patent and that said Letters Patent is hereby corrected as shown below:

In column 12, line 42, in Claim 1, delete "comprsing:" and insert -- comprising: --, therefor.

In column 13, line 8, in Claim 4, delete "transition" and insert -- transition, --, therefor.

In column 14, line 3, in Claim 4, delete "nodes," and insert -- nodes, and wherein within the power saving mesh point mode the node performs power management --, therefor.

In column 14, line 6, in Claim 5, delete "rate" and insert -- rate of --, therefor.

Signed and Sealed this

Fifteenth Day of June, 2010

David J. Kappos
*Director of the United States Patent and Trademark Office*